(12) United States Patent
Sekaran et al.

(10) Patent No.: US 10,419,436 B2
(45) Date of Patent: Sep. 17, 2019

(54) METHOD TO IMPROVE KEYBOARD, VIDEO AND MOUSE (KVM) SECURITY ON BLOCKING INCOMING KVM PRIVILEGE REQUEST

(71) Applicant: American Megatrends International, LLC, Norcross, GA (US)

(72) Inventors: Gopinath Sekaran, Sholinghur (IN); Deepak M. Nair, Kottayam (IN); Mohammed Javith Akthar M, Erode (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 83 days.

(21) Appl. No.: 15/489,355

(22) Filed: Apr. 17, 2017

(65) Prior Publication Data

US 2018/0302407 A1    Oct. 18, 2018

(51) Int. Cl.
| | | |
|---|---|---|
| *G06F 21/00* | (2013.01) | |
| *H04L 29/06* | (2006.01) | |
| *G06F 21/60* | (2013.01) | |
| *G06F 21/82* | (2013.01) | |

(52) U.S. Cl.
CPC ............ *H04L 63/10* (2013.01); *G06F 21/604* (2013.01); *G06F 21/82* (2013.01); *G06F 2221/2141* (2013.01)

(58) Field of Classification Search
CPC ...... G06F 9/45558; G06F 3/023; G06F 21/85; H04L 67/10; H04L 67/025
See application file for complete search history.

(56) References Cited

U.S. PATENT DOCUMENTS

| | | | | |
|---|---|---|---|---|
| 2002/0116539 A1* | 8/2002 | Bryczkowski | .......... | G06F 9/465 719/317 |
| 2009/0249479 A1* | 10/2009 | Yin | ..................... | G06F 21/6218 726/21 |

\* cited by examiner

*Primary Examiner* — Ghazal B Shehni
(74) *Attorney, Agent, or Firm* — Locke Lord LLP; Tim Tingkang Xia, Esq.

(57) ABSTRACT

Aspects of the disclosure relate to systems and methods of improving keyboard, video, and mouse (KVM) security on blocking KVM privilege request. A management device includes a processor and a non-volatile memory storing computer executable code. The computer executable code, when executed at the processor, is configured to: establish a first KVM session for a management device in response to a first privilege request; provide options of KVM authorities; select one of the options based on a first user instruction; and upon receiving a second privilege request requesting for a second KVM session, perform a first operation based on the selected one of the options.

18 Claims, 4 Drawing Sheets

METHOD TO IMPROVE KEYBOARD, VIDEO AND MOUSE (KVM) SECURITY ON BLOCKING INCOMING KVM PRIVILEGE REQUEST

FIELD

The present disclosure relates generally to management controller technology, and more particularly to systems and methods for improving keyboard, video and mouse (KVM) security on blocking incoming KVM privilege request.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A host computing system may be available for multiple KVM sessions. However, when a session holder, such as an administrator, uses a master session to perform confidential or critical operations in the host computing system, he doesn't want the master session be disturbed by the incoming KVM privilege request from new or secondary session holders.

Therefore, an unaddressed need exists in the art to address the aforementioned deficiencies and inadequacies.

SUMMARY

Certain aspects of the present disclosure relate to a system, which includes a management device. The management device includes a processor and a non-volatile memory storing computer executable code. The computer executable code, when executed at the processor, is configured to: establish a first KVM session in response to a first privilege request; provide options of KVM authorities; select one of the options based on a first user instruction received from the first KVM session; and upon receiving a second privilege request requesting for a second KVM session, perform a first operation based on the selected one of the options.

In certain embodiments, the options of KVM authorities includes a deny access option, and when the selected one of the options is the deny access option, the first operation is denying the second privilege request.

In certain embodiments, the options of KVM authorities includes a video only option, and when the selected one of the options is the video only option, the first operation is establishing the second KVM session, and the second KVM session allows video redirection but not keyboard and mouse redirection.

In certain embodiments, the options of KVM authorities includes a full access option, and when the selected one of the options is the full access option, the first operation is establishing the second KVM session, and the second KVM session allows video, keyboard and mouse redirection.

In certain embodiments, the computer executable code, when executed at the processor, is further configured to: display the options of KVM authorities and receive the first use instruction through a user interface.

In certain embodiments, the computer executable code, when executed at the processor, is further configured to: in response to receiving the second privilege request, send a warning message corresponding to the selected one of the options.

In certain embodiments, the computer executable code, when executed at the processor, is configured to select one of the options before receiving the second privilege request.

In certain embodiments, the computer executable code, when executed at the processor, is configured to select one of the options after receiving the second privilege request.

In certain embodiments, the computer executable code, when executed at the processor, is further configured to, after performing the first operation and upon receiving a third privilege request requesting for a third KVM session: select another one of the options based on a second user instruction received from the first KVM session; and perform a second operation based on the selected another one of the options.

In certain embodiments, the management device is a management controller (BMC).

Certain aspects of the present disclosure relate to a method for improving keyboard, video and mouse (KVM) security. In certain embodiments, the method includes: establishing a first KVM session for a management device in response to a first privilege request; providing options of KVM authorities; selecting one of the options based on a user instruction received from the first KVM session; and upon receiving a second privilege request requesting for a second KVM session, performing a first operation based on the selected one of the options.

In certain embodiments, the options of KVM authorities comprise a deny access option, a video only option, and a full access option. When the selected one of the options is the deny access option, the first operation is denying the second privilege request. When the selected one of the options is the video only option, the first operation is establishing the second KVM session, and the second KVM session allows video redirection but not keyboard and mouse redirection. When the selected one of the options is the full access option, the first operation is establishing the second KVM session, and the second KVM session allows video, keyboard and mouse redirection.

In certain embodiments, the step of selecting one of the options is performed before the step of receiving the second privilege request.

In certain embodiments, the step of selecting one of the options is performed after the step of receiving the second privilege request.

In certain embodiments, the method further includes, after performing the first operation and upon receiving a third privilege request requesting for a third KVM session: selecting another one of the options based on a second user instruction received from the first KVM session; and performing a second operation based on the selected another one of the options.

In certain embodiments, the method further includes: displaying the options of KVM authorities and receiving the first use instruction through a user interface.

In certain embodiments, the method further includes: in response to receiving the second privilege request, sending a warning message corresponding to the selected one of the options.

Certain aspects of the present disclosure relate to a non-transitory computer readable medium storing computer executable code. In certain embodiments, the computer executable code may be the firmware or modules stored in the non-volatile memory 156 as described above. The computer executable code, when being executed, may perform one of the methods described above. In certain embodiments, the non-transitory computer readable medium may include, but not limited to, the non-volatile memory 156 of the management device 150 as described above, or any other storage media of the management device 150. These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

To improve KVM security, a master session has the option to block the incoming KVM privilege request and select auto-response for the request.

In certain embodiments, the master session can select auto-response permission as "Video Only." If master session holder considers allowing video to be viewed is safe. Requested new/secondary session will receive "Video Only" KVM privilege. Secondary session can only view video from the host computing device.

In certain embodiments, the master session can select auto-response permission as "Deny Access." If master session holder considers allowing video to be viewed is security problematic. Requested new/secondary session will receive "Deny Access" KVM privilege. Requested session will be intimated that master session denied the request hence closing viewer.

When the master session holder responses automatically on blocked incoming request, master session holder operations in the host will be safe.

Figure 1:
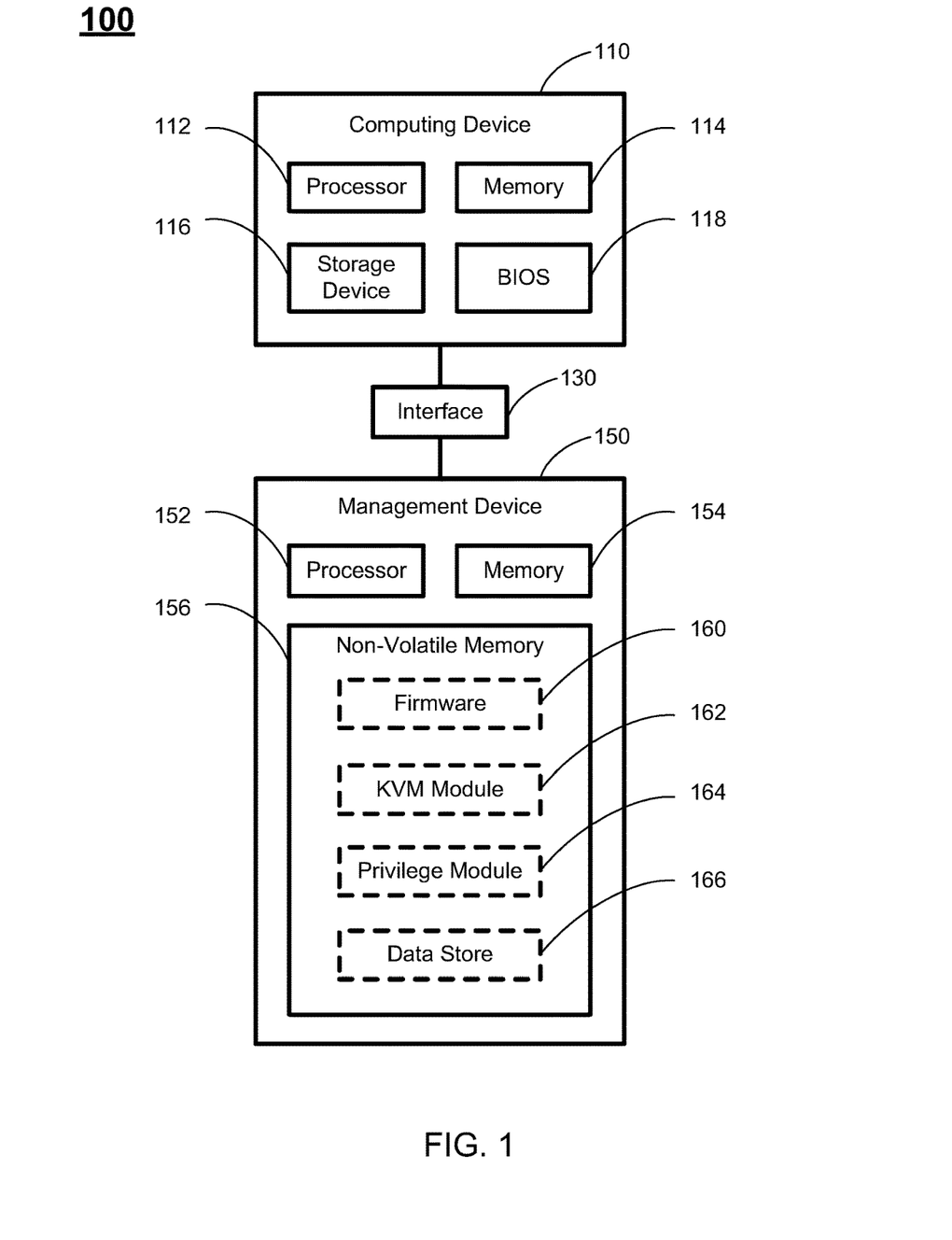
FIG. 1 schematically depicts an exemplary system according to certain embodiments of the present disclosure.

In accordance with the purposes of present disclosure, as embodied and broadly described herein, in certain aspects, the present disclosure relates to a system having a computing device and a management device in communication with the computing device. FIG. 1 schematically depicts an exemplary system according to certain embodiments of the present disclosure. As shown in FIG. 1, a system 100 includes a computing device 110, a management device 150, and an interface 130 connecting the computing device 110 and the management device 150.

The computing device 110 may function as a server or a host computer of the management device 150. In certain embodiments, the computing device 110 may be a general purpose computer, a specialized computer, or a headless computer. In certain embodiments, as shown in FIG. 1, the computing device 110 may include, without being limited to, a processor 112, a memory 114, a storage device 116, a basic input/output system (BIOS) 118, and other required memory and I/O modules (not shown). Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor 112 and the memory 114 may be components embedded on the baseboard, or may be connected to the baseboard through at least one interface. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements.

The processor 112 may be a central processing unit (CPU) which is configured to control operation of the computing device 110. The processor 112 can execute an operating system (OS) or other applications of the computing device 110. In some embodiments, the computing device 100 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

The BIOS 118 is a type of firmware used to perform hardware initialization during the booting process (power-on startup) on the computing device 110, and to provide runtime services for operating systems and programs. In certain embodiments, the BIOS 118 is implemented as a BIOS chip built into the computing device 110. For example, the BIOS chip may be provided on the baseboard of the computing device 110. In certain embodiments, when the computing device 110 is powered on, the BIOS 118 is executed first at the start of the booting process.

The management device 150 is a microcontroller used to monitor the operation of the computing device 110. In certain embodiments, the management device 150 may be a component on the baseboard of the computing device 110. In certain embodiments, the management device 150 is a separated component from the computing device 110, and the interface 130 may be present between the computing device 110 and the management device 150. In certain embodiment, the interface 130 may be a system interface, a universal serial bus (USB) interface or a network, or any other types of interfaces to communicatively connect the management device 150 to the computing device 110.

In certain embodiments, the management device 150 may be connected to more than one computing device, and among these computing devices, only the computing device 110 functions as the host computer of the management device 150.

In certain embodiments, the management device 150 may be implemented by a system on chip (SoC), such as a BMC or a service processor (SP), or by other management controllers. The BMC refers to a specialized microcontroller that manages the interface between system management software and platform hardware. Different types of sensors can be built into the computing device 110, and the BMC reads these sensors to obtain parameters such as temperature, cooling fan speeds, power status, OS status, etc. The BMC monitors the sensors and can send alerts to a system administrator via a network if any of the parameters do not stay within preset limits, indicating a potential failure of the computing device 110. The administrator can also remotely communicate with the BMC to take some corrective action such as resetting or power cycling the system to get a hung OS running again.

In certain embodiments, the management device 150 may include necessary hardware and software components to perform certain predetermined tasks. For example, as shown in FIG. 1, the management device 150 includes a processor 152, a memory 154, and a non-volatile memory 156. In certain embodiments, the processor 152, the memory 154, and the non-volatile memory 156 may be similar to the processor 112, the memory 114, and the storage device 116 of the computing device 110. Further, the management device 150 may include other hardware components and software components (not shown) to perform its corresponding tasks. Examples of these hardware and software components may include, but not limited to, other required memory, interfaces, buses, I/O modules and peripheral devices.

The processor 152 is configured to control operation of the management device 150. In certain embodiments, the processor 152 may be a central processing unit (CPU). The processor 152 can execute any computer executable code or instructions, such as the firmware 160, the KVM module 162, and the privilege module 164 of the management device 150 or other applications and instructions of the management device 150. In certain embodiments, the management device 150 may run on more than one processor, such as two processors, four processors, eight processors, or any suitable number of processors.

The memory 154 can be a volatile memory, such as the random-access memory (RAM), for storing the data and information during the operation of the management device 150. In certain embodiments, the memory 154 may be a volatile memory array.

The non-volatile memory 156 is a data storage media for storing the applications of the management device 150. Examples of the non-volatile memory 156 may include flash memory, memory cards, USB drives, hard drives, floppy disks, optical drives, or any other types of non-volatile data storage devices. In certain embodiments, the management device 150 may have multiple non-volatile memories 156, which may be identical storage devices or different types of storage devices, and the applications may be stored in one or more of the non-volatile memories 156 of the management device 150.

As shown in FIG. 1, the non-volatile memory 156 of the management device 150 stores a firmware 160, the KVM module 162, the privilege module 164 and the data store 166. In certain embodiments, the non-volatile memory 156 may include other applications or modules necessary for the operation of the management device 150. It should be noted that all of the modules are each implemented by computer executable codes or instructions, which collectively forms a software image. In certain embodiments, each of the modules may further include sub-modules. Alternatively, some of the modules may be combined as one stack.

In certain embodiments, the KVM module 162, when being executed by the processor 152 at the memory 154, is configured to establish one or more sessions in response to one or more privilege requests from users, so as to provide KVM redirections between the KVM of the users and the management device 150 and the computing device 110. For example, a user may request a KVM session through a remote terminal. Once the KVM session is established between the remote terminal and the management device 150, the management device 150 may receive keyboard and mouse input from the remote terminal, and may redirect video from the management device 150 to the remote terminal, so that a display of the remote terminal shows the video from the management device 150. In certain embodiments, the session established by a user, such as an administrator, may be a master session.

In certain embodiments, the privilege module 164, when being executed by the processor 152 at the memory 154, is configured to display a user interface (UI) for a master session user, either during the establishment of the KVM master session or during the performance of the master session and in response to a privilege request, such that the master session user is able to choose an optional for KVM authorities.

In certain embodiments, the privilege module 164, when being executed by the processor 152 at the memory 154, is further configured to, upon receiving the further privilege request, perform an operation based on the selected options. In one example, the options of KVM authorities includes "Deny Access," in other words, the privilege request is denied and the user submitting the privilege request cannot use KVM to interact with the computing device 110. In another example, the response includes "Video Only," in other words, the user submitting the privilege request can only view video redirected from the management device 150 or the computing device 110, but cannot perform any other actions to the computing device 110. In a further example, the response may be "Full Access," such that the user submitting the privilege request is able to establish a KVM session with the computing device 110. In this example, the newly established session is a secondary session that is secondary to the master session.

The data store 166 is a database for storing necessary data of the firmware 160, the KVM module 162, and the privilege module 164. In certain embodiments, the data stored in the data store 146 may include, without being limited thereto, KVM connection options, such as "Deny Access," "Video Only," and "Full Access," and operations corresponding to the options of privilege request.

In certain aspects, the present disclosure relates to a method to improve KVM security on blocking incoming KVM privilege request. In certain embodiments, the method may be implemented by a system as shown in FIG. 1.

Figure 2:
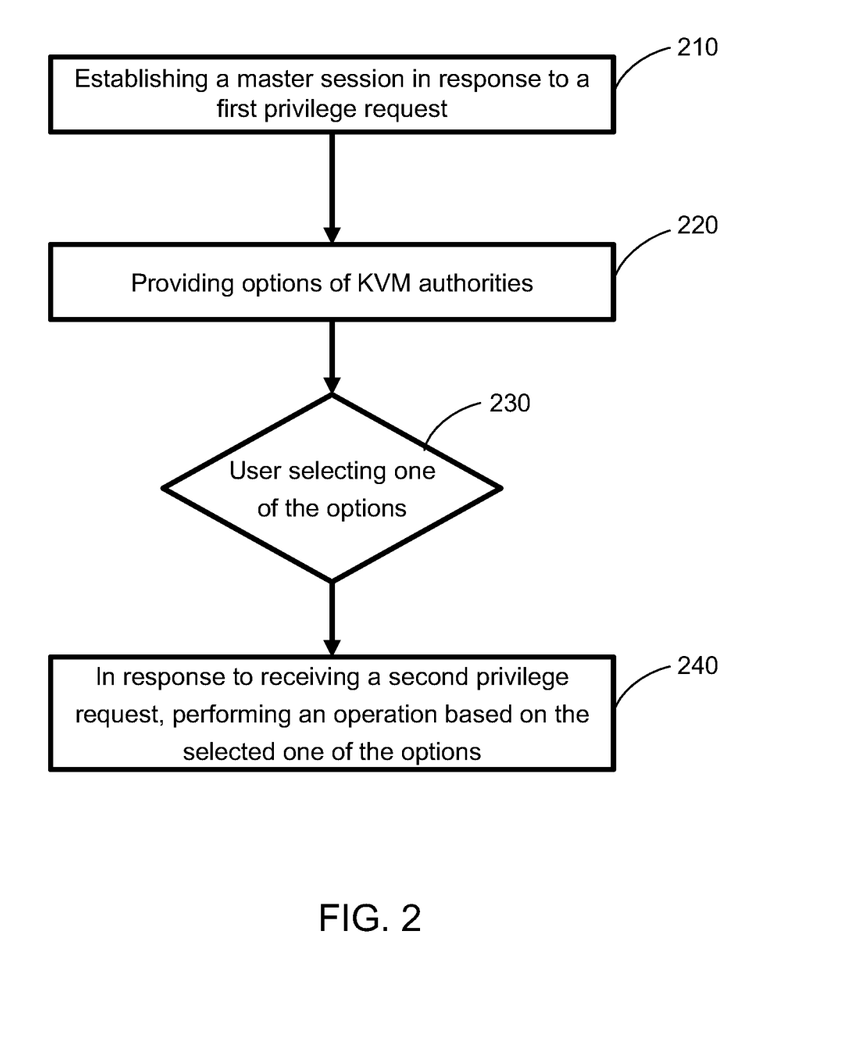
FIG. 2 depicts a process of session management for improving KVM security according to certain embodiments of the present disclosure.
Figure 3:
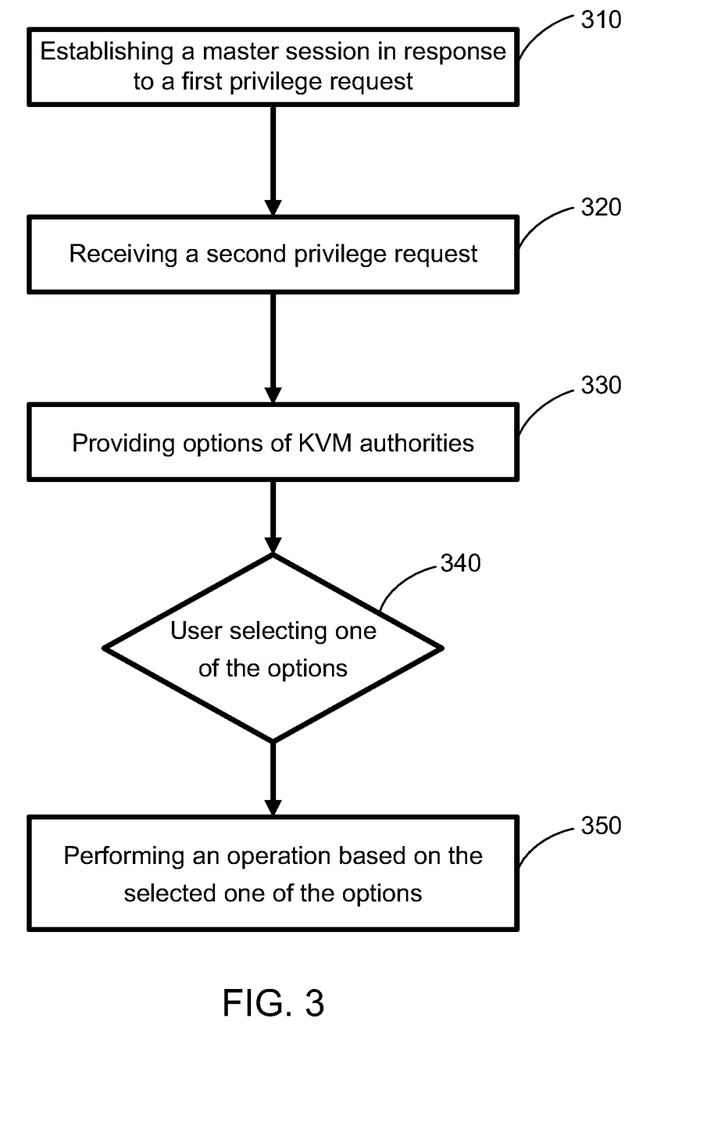
FIG. 3 depicts a process of session management for improving KVM security according to certain embodiments of the present disclosure.

FIG. 2 depicts a process or method to improve KVM security according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 210, a first user, such as an administrator, make a first KVM privilege request for establishing a KVM connection with the management device 150, and in response to the first privilege request, a master session is established between the KVM and the management device 150 or the computing device 110.

At procedure 220, when the master session is established, the management device 150 provides options of KVM authorities. In one example, the management device 150 displays a user interface (UI) to the first user. The user interface provides options for managing further privilege requests. For example, the options of KVM authorities may include "Deny Access," "Video Only" and "Full Access." In certain embodiments, "Deny Access" indicates completely blocking a second user (or all the users other than the first user) from establishing KVM sessions with the management device 150, or the management device 150 may simply keep silent to a second privilege request without any response. "Video Only" indicates allowing the second user to establish a second KVM session that is secondary to the master session, such that the second user can have read-only access to the video redirected from the computing device 110, but there is no redirection of keyboard and mouse. That is under the secondary KVM session, the second user cannot inputs from the keyboard and the mouse to the management device 150. "Full Access" indicates allowing the second user to establish a full functional KVM session, where the second user is able to establish KVM redirection to the management device 150. In certain embodiments, the options may not include the "Full Access" selection.

At procedure 230, the first user or the administrator selects one of the options of KVM authorities, for example from the user interface, and the selection may be stored in the data store 166.

At procedure 240, upon receiving a second privilege request from the second user, the management device 150 performs an operation based on the selected option, where the second privilege request asks for establishing a secondary session with the management device 150. The operations may be as follows.

When the selected option is "Deny Access," in response to the second privilege request, the management device 150 may deny the access of the second user based on the selection of the "Deny Access" option of the administrator (the first user). Particularly, the second KVM session corresponding to the second privilege request will not be established, or the management device 150 may choose to not response to the second privilege request. In certain embodiments, the management device 150 may also send a warning message corresponding to the selection, such as "Access Denied" to the second user sending the second privilege request, and the warning message may be shown on the display of a terminal of the second user.

When the selected option is "Video Only," in response to the second privilege request, the management device 150 may allow read-only video access of the second user. Specifically, the management device 150 may establish a secondary session with limited function between the second user and the management device 150. The secondary session allows redirection of the video, but does not allow redirection of the keyboard and the mouse. Accordingly, the second user submitting the second privilege request may be able to view the video redirected from the management device 150, but he cannot enter information from the keyboard or mouse to the management device 150. In certain embodiments, the management device 150 may send a warning message, such as "Video Only" message to that second user, and the warning message may be shown on the display of the terminal of the second user.

In certain embodiments, the management device 150 may allow full access of one of the other users corresponding to the "Full Access" selection of the administrator. Under this scenario, the secondary session is established between the one of the other users and the management device 150. The secondary session is fully functional, and the secondary session allows KVM redirection through the management device 150.

In certain embodiments, another use, for example a third user, may send a third privilege request to the management device 150, and the management device 150, in response to receiving the third privilege request, may perform the operation as described in the procedure 240. In this embodiment, the first user or the administrator only needs to make one selection of the options, and the management device 150 will automatically perform the same operation corresponding to the selected option, for all the following requests from the other users. Therefore, the procedure is convenient for the first user to do his work without interruption.

Alternatively, in certain embodiments, when the third use sends the third privilege request to the management device 150, the management device 150, in response to receiving the third privilege request, may perform the procedures of 220, 230 and 240 as described above. In other words, after receiving the third privilege request, the management device 150 may provide options of KVM authorities, the administrator selects one of the options of privilege, and the management device 150 perform an operation based on the selection. The selection of the options in response to the third privilege request may be the same as or different from the selection in the procedure 230. Thus, the operation in response to the third privilege request may be the same as or different from the operation in response to the second privilege request. By this method, the first user is able to provide different responses to the privilege requests from different users. In certain embodiments, those differences may be automatically defined. For example, the first user may choose "Video Only" option to users in the same group or requests from a local area network based on their IP address, and choose "Deny Access" option to users outside the group or requests from outside the local area network.

FIG. 3 depicts a process or method to improve KVM security according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, a first user, such as an administrator, send a first privilege request to the management device 150, and in response to the first privilege request, a master session is established between the KVM and the management device 150 or the computing device 110. The procedure 310 may be the same as the procedure 210 in FIG. 2.

At procedure 320, the management device 150 receives a second privilege request from a second user, the second privilege request asks for establishing a secondary session with the management device 150. The secondary session is secondary to the master session.

At procedure 330, upon receiving the second privilege request, the management device 150 does not establish another session. Instead, the management device 150 provides options of KVM authorities. In one example, the management device 150 displays a user interface (UI) to the first user. The user interface provides options for managing further privilege requests. For example, the options may include "Deny Access," "Video Only" and "Full Access." In certain embodiments, "Deny Access" indicates completely blocking the other users from establishing KVM sessions with the management device 150. "Video Only" indicates allowing the other users to establish a second KVM session that is secondary to the master session, such that the other user can have read-only access to the video redirected from the computing device 110, but there is no redirection of keyboard and mouse. That is under the secondary KMV session, the other user cannot inputs from the keyboard and the mouse to the management device 150. "Full Access" indicates allowing the other users to establish a full functional KVM session, where the other user is able to establish KVM redirection to the management device 150. In certain embodiments, the options may not include the "Full Access" selection. The procedure 330 may be the same as the procedure 220.

At procedure 340, the first user or the administrator selects one of the options, for example from the user interface, and the selection may be stored in the data store 166.

At procedure 350, based on the selection of the first user, such as the selection stored in the data store 166, the management device 150 performs an operation based on the selected option, where the second privilege request asks for establishing a secondary session with the management device 150. The operations may be as follows.

When the selected option is "Deny Access," the management device 150 may deny the access of one of the other users (or the second user) corresponding to the "Deny Access" selection of the administrator. Particularly, the second KVM session corresponding to the second privilege request will not be established, or the management device 150 may choose to not response to the second privilege request. In certain embodiments, the management device 150 may also send a warning message corresponding to the selection, such as "Access Denied" to the other user sending the second privilege request.

When the selected option is "Video Only," the management device 150 may allow read-only video access of one of the other users. Specifically, the management device 150 may establish a secondary session with limited function. For example, the secondary session allows redirection of the video, but does not allow redirection of the keyboard and the mouse. Accordingly, the other user submitting the second privilege request may be able to view the video redirected from the management device 150, but he cannot enter information from the keyboard or mouse to the management device 150. In certain embodiments, the management device 150 may send a warning message, such as "Video Only" message to that user.

In certain embodiments, the management device 150 may allow full access of one of the other users corresponding to the "Full Access" selection of the administrator. Under this scenario, a secondary session is established between the one of the other users and the management device 150. The secondary session is fully functional, and the secondary session allows KVM redirection through the management device 150.

In the above embodiment, the first user does not need to make a selection until the second user submits a second privilege request.

Figure 4:
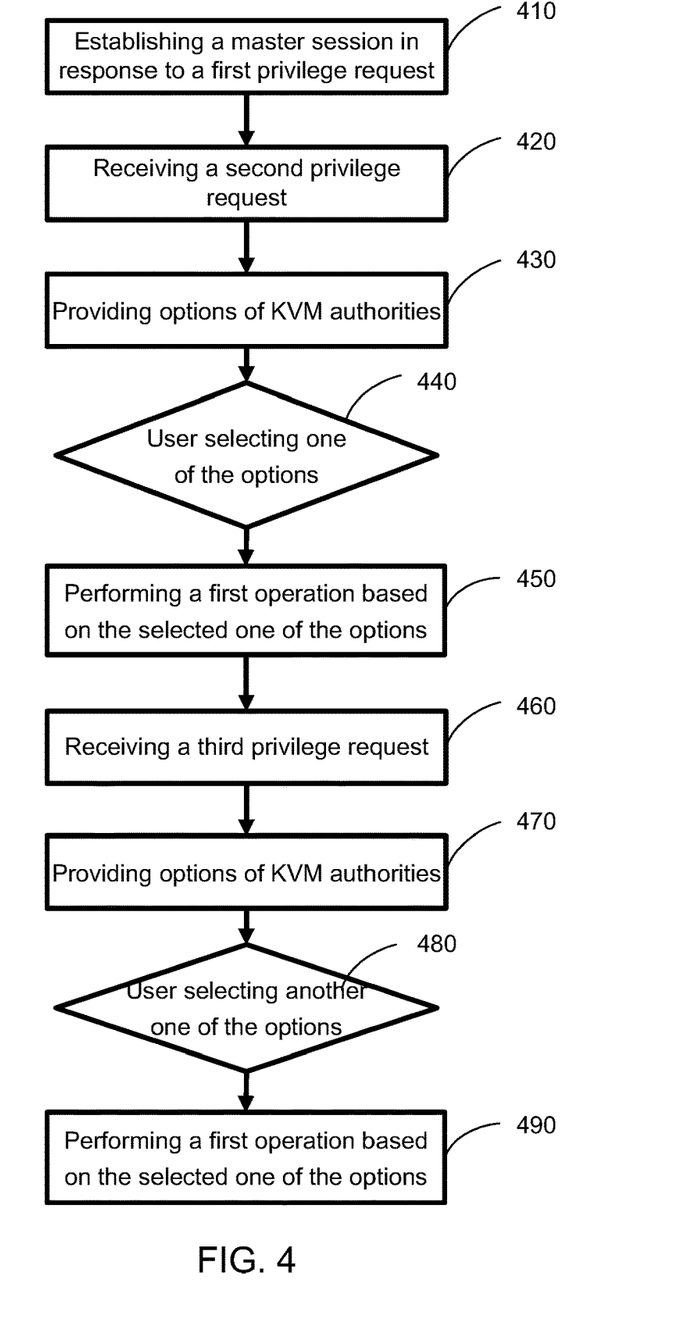
FIG. 4 depicts a process of session management for improving KVM security according to certain embodiments of the present disclosure.

FIG. 4 depicts a process or method to improve KVM security according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in FIG. 4.

The procedures 410-450 may be the same as the procedures 310-350 as shown in FIG. 3, which includes response to the second privilege request from the second user.

In certain embodiments, another user such as a third user, may send a third privilege request to the management device 150, and the management device 150, in response to receiving the third privilege request, may perform the same operation as described in the procedure 450. In this embodiment, the first user or the administrator only needs to make one selection of the options, and the management device 150 will automatically perform the same operation corresponding to the selected option, for all the following requests from other users. Therefore, the procedure is convenient for the first user to do his work without interruption.

Alternatively, in certain embodiments, when the third user sends the third privilege request to the management device 150, the management device 150, in response to receiving the third privilege request, may perform the procedures of 450-490. In other words, after receiving the third privilege request from the third user at procedure 460, the management device 150 may provide options of KVM authorities at procedure 470. In certain embodiments, the procedure 470 may be different from the procedure 430. For example, the procedure 470 may be only displaying the options, or may not be included in this embodiment at all. At procedure 480, the administrator selects another one of the options, and then at procedure 490, the management device 150 performs a second operation based on the selection. The selection of the options in response to the third privilege request may be the same as or different from the selection in the procedure 340. Thus, the operation in response to the third privilege request may be the same as or different from the operation in response to the second privilege request. In this embodiment, the master session may provide different responses to privilege requests from different users.

In another aspect, the present disclosure relates to a non-transitory computer readable medium storing computer executable code. In certain embodiments, the computer executable code may be at least a part of the firmware 160, the KVM module 162, the privilege module 164, or the data store 166 of the management device 150 as described above. The computer executable code, when being executed, may perform one of a method described above. In certain embodiments, the non-transitory computer readable medium may include, but not limited to, non-volatile memory 156 of the management device 150 as described above, or any other storage media of the management device 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management device, comprising a processor and a non-volatile memory storing computer executable code, wherein the computer executable code, when executed at the processor, is configured to:
establish a first KVM session in response to a first privilege request;
provide options of KVM authorities;
select one of the options based on a first user instruction received from the first KVM session; and
upon receiving a second privilege request requesting for a second KVM session, perform a first operation based on the selected one of the options;
wherein the options of KVM authorities comprise a deny access option, and when the selected one of the options is the deny access option, the first operation is denying the second privilege request;
wherein the options of KVM authorities comprise a video only option, and when the selected one of the options is the video only option, the first operation is establishing the second KVM session, and the second KVM session allows video redirection but not keyboard and mouse redirection; and
wherein different responses to privilege requests from different users may be automatically defined, such that the video only option may be chosen for users in a same group or requests from a local area network based on IP address, and the deny access option may be chosen for users outside the same group or requests from outside the local area network.

2. The system of claim 1, wherein the options of KVM authorities comprise a full access option, and when the selected one of the options is the full access option, the first operation is establishing the second KVM session, and the second KVM session allows video, keyboard and mouse redirection.

3. The system of claim 1, wherein the computer executable code, when executed at the processor, is further configured to: display the options of KVM authorities and receive the first use instruction through a user interface.

4. The system of claim 1, wherein the computer executable code, when executed at the processor, is further configured to:
in response to receiving the second privilege request, send a warning message corresponding to the selected one of the options.

5. The system of claim 1, wherein the computer executable code, when executed at the processor, is configured to select one of the options before receiving the second privilege request.

6. The system of claim 1, wherein the computer executable code, when executed at the processor, is configured to select one of the options after receiving the second privilege request.

7. The system of claim 6, wherein the computer executable code, when executed at the processor, is further configured to, after performing the first operation and upon receiving a third privilege request requesting for a third KVM session:
select another one of the options based on a second user instruction received from the first KVM session; and
perform a second operation based on the selected another one of the options.

8. The system of claim 1, wherein the management device is a management controller (BMC).

9. A method for improving keyboard, video and mouse (KVM) security, comprising:
establishing a first KVM session for a management device in response to a first privilege request;
providing options of KVM authorities;
selecting one of the options based on a user instruction received from the first KVM session; and
upon receiving a second privilege request requesting for a second KVM session, performing a first operation based on the selected one of the options;
wherein the options of KVM authorities comprise a deny access option, and when the selected one of the options is the deny access option, the first operation is denying the second privilege request;
wherein the options of KVM authorities comprise a video only option, and when the selected one of the options is the video only option, the first operation is establishing the second KVM session, and the second KVM session allows video redirection but not keyboard and mouse redirection; and
wherein different responses to privilege requests from different users may be automatically defined, such that the video only option may be chosen for users in a same group or requests from a local area network based on IP address, and the deny access option may be chosen for users outside the same group or requests from outside the local area network.

10. The method of claim 9,
wherein the options of KVM authorities further comprise a full access option;
and
wherein when the selected one of the options is the full access option, the first operation is establishing the second KVM session, and the second KVM session allows video, keyboard and mouse redirection.

11. The method of claim 9, wherein the step of selecting one of the options is performed before the step of receiving the second privilege request.

12. The method of claim 9, wherein the step of selecting one of the options is performed after the step of receiving the second privilege request.

13. The method of claim 12, further comprising, after performing the first operation and upon receiving a third privilege request requesting for a third KVM session:
selecting another one of the options based on a second user instruction received from the first KVM session; and
performing a second operation based on the selected another one of the options.

14. The method of claim 9, further comprising: displaying the options of KVM authorities and receiving the first use instruction through a user interface.

15. The method of claim 1, further comprising:
in response to receiving the second privilege request, sending a warning message corresponding to the selected one of the options.

16. A non-transitory computer readable medium storing computer executable code, wherein the computer executable code, when executed at a processor of a management device, is configured to:
- establish a first KVM session in response to a first privilege request;
- provide options of KVM authorities;
- select one of the options based on a first user instruction received from the first KVM session; and
- upon receiving a second privilege request requesting for a second KVM session, perform a first operation based on the selected one of the option;
- wherein the options of KVM authorities comprise a deny access option, and when the selected one of the options is the deny access option, the first operation is denying the second privilege request;
- wherein the options of KVM authorities comprise a video only option, and when the selected one of the options is the video only option, the first operation is establishing the second KVM session, and the second KVM session allows video redirection but not keyboard and mouse redirection; and
- wherein different responses to privilege requests from different users may be automatically defined, such that the video only option may be chosen for users in a same group or requests from a local area network based on IP address, and the deny access option may be chosen for users outside the same group or requests from outside the local area network.

17. The non-transitory computer readable medium of claim 16,
- wherein the options of KVM authorities further comprise a full access option; and
- wherein when the selected one of the options is the full access option, the first operation is establishing the second KVM session, and the second KVM session allows video, keyboard and mouse redirection.

18. The non-transitory computer readable medium of claim 16, wherein the computer executable code, when executed at the processor, is further configured to:
- in response to receiving the second privilege request, send a warning message corresponding to the selected one of the options.

* * * * *